(12) United States Patent
Komatsu

(10) Patent No.: US 12,454,998 B2
(45) Date of Patent: Oct. 28, 2025

(54) ROTARY POWER TRANSMISSION DEVICE WITH ACTUATOR RETENTION FEATURE

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 18/795,886

(22) Filed: Aug. 6, 2024

(65) Prior Publication Data

US 2024/0392866 A1 Nov. 28, 2024

Related U.S. Application Data

(62) Division of application No. 18/179,418, filed on Mar. 7, 2023, now Pat. No. 12,085,159.

(60) Provisional application No. 63/320,863, filed on Mar. 17, 2022.

(51) Int. Cl.
*F16H 48/34* (2012.01)
*F16H 48/40* (2012.01)
F16H 48/24 (2006.01)

(52) U.S. Cl.
CPC .............. *F16H 48/34* (2013.01); *F16H 48/40* (2013.01); *F16H 48/24* (2013.01)

(58) Field of Classification Search
CPC .......... F16H 48/34; F16H 48/40; F16H 48/24; F16D 11/14; F16D 27/118

USPC .................................................. 475/150, 231
See application file for complete search history.

(56) References Cited

U.S. PATENT DOCUMENTS

| | | | | |
|---|---|---|---|---|
| 5,326,333 | A * | 7/1994 | Niizawa | F16D 27/115 475/249 |
| 7,452,299 | B2 * | 11/2008 | Teraoka | F16H 48/34 192/84.92 |
| 7,887,450 | B2 * | 2/2011 | Fusegi | F16H 48/30 192/84.96 |
| 11,118,665 | B2 * | 9/2021 | Creech | F16H 48/40 |
| 12,085,159 | B2 * | 9/2024 | Komatsu | F16H 48/40 |
| 2007/0054771 | A1 * | 3/2007 | Fusegi | F16H 48/30 475/231 |
| 2010/0056314 | A1 * | 3/2010 | Maruyama | F16H 48/08 475/150 |
| 2011/0105264 | A1 * | 5/2011 | Maruyama | F16D 27/09 192/66.1 |
| 2017/0297428 | A1 * | 10/2017 | Inose | F16D 27/112 |
| 2020/0079214 | A1 * | 3/2020 | Johnson | B60K 17/00 |

* cited by examiner

*Primary Examiner* — Roger L Pang
(74) *Attorney, Agent, or Firm* — Reising Ethington P.C.

(57) ABSTRACT

A rotary power transmission device includes a device housing, a clutch, an actuator and a retainer. The device housing has an interior in which multiple components are received for rotation. The clutch is received within the device housing and has a clutch ring selectively engageable with one of said multiple components. The actuator has a coil and a plunger driven for movement along an axis and relative to the clutch. And the retainer has a first portion that engages the device housing and a second portion that radially overlaps the coil and limits axial movement of the coil relative to the device housing.

14 Claims, 6 Drawing Sheets

ROTARY POWER TRANSMISSION DEVICE WITH ACTUATOR RETENTION FEATURE

REFERENCE TO RELATED APPLICATIONS

This application is a divisional of U.S. patent application Ser. No. 18/179,418 filed on Mar. 7, 2023 and claims the benefit of U.S. Provisional Application Ser. No. 63/320,863 filed on Mar. 17, 2022. The entire contents of the priority applications are incorporated herein by reference.

TECHNICAL FIELD

The present disclosure relates generally to rotary power transmission device having an actuator for a clutch, and a retention feature for at least part of the actuator.

BACKGROUND

Electromagnetic actuators have a wire coil that generates an electromagnetic field to drive a plunger and actuate a device (e.g. move a clutch component). The coil is received within a housing that is mounted to a housing of the device. The coil housing is often mounted by a plurality of individual fasteners and may be held in place by a component that increases the axial length or size of the housing of the device, which can be undesirable in many applications. The individual fasteners require increase the complexity and the time and cost to build and assemble the device.

SUMMARY

In at least some implementations, a rotary power transmission device includes a device housing, a clutch, an actuator and a retainer. The device housing has an interior in which multiple components are received for rotation. The clutch is received within the device housing and has a clutch ring selectively engageable with one of said multiple components. The actuator has a coil and a plunger driven for movement along an axis and relative to the clutch. And the retainer has a first portion that engages the device housing and a second portion that radially overlaps the coil and limits axial movement of the coil relative to the device housing.

In at least some implementations, the coil includes a coil housing and a wire coil within the coil housing, and wherein the first portion extends axially and is received over a portion of the device housing, and the second portion extends from the sidewall and overlaps part of the coil housing. In at least some implementations, the first portion of the retainer is press-fit onto an outer surface of the device housing. In at least some implementations, the first portion extends axially and the second portion extends radially from the sidewall. In at least some implementations, the coil housing has an inboard end adjacent to the device housing, and the coil housing has an outboard end opposite and axially spaced from the inboard end, and wherein the retainer overlaps part of the coil housing between the inboard end and the outboard end, and the retainer does not extend axially beyond the outboard end. In at least some implementations, the coil housing includes a flange that extends radially outwardly and is located between the inboard end and the outboard end, and the flange includes a first face received against the device housing and the flange includes a second face engaged by the second portion of the retainer.

In at least some implementations, the coil has a coil housing and a wire coil within the coil housing, and wherein the first portion of the retainer includes a flange coupled to the device housing and the second portion of the retainer includes a sidewall that extends from the flange and overlaps part of the coil housing. In at least some implementations, the device housing includes a groove and wherein the flange is press-fit into the groove with a friction fit between one surface of the flange and a surface defining the groove. In at least some implementations, when the plunger is driven for movement, the plunger slides along an annular surface of the device housing, and the groove is formed radially inwardly spaced from the annular surface. In at least some implementations, the flange extends axially into the groove, and the flange has a radially inner surface and an opposite radially outer surface with at least one of the radially inner surface and the radially outer surface frictionally engaged with the device housing within the groove.

In at least some implementations, the coil has a coil housing and a wire coil within the coil housing, and wherein the retainer includes multiple inwardly extending flanges that define the second portion of the retainer, where each flange radially overlaps the coil housing and traps a portion of the coil housing between the flange and the device housing. In at least some implementations, the first portion of the retainer is defined by a main body from which the flanges extend radially inwardly. In at least some implementations, the device housing includes a groove that is open to a radially outer surface of the device housing and that extends radially into the device housing, and wherein the main body is received within the groove. In at least some implementations, the coil housing is located within the device housing radially inwardly of the groove, and the flanges extend inwardly from the main body and radially overlap part of the coil housing. In at least some implementations, the device housing includes a plurality of circumferentially spaced apart skirts, and wherein the groove is formed in multiple skirts, and the flanges are received circumferentially between adjacent skirts. In at least some implementations, the main body includes a first end and a second end circumferentially spaced apart from the first end, with a gap between the first end and the second end.

In at least some implementations, a rotary power transmission device includes a device housing having an interior in which multiple components are received for rotation, a clutch ring received within the device housing and selectively engageable with one of said multiple components, an actuator and a retainer. The actuator has a coil housing, a coil within the coil housing, and a plunger driven for movement along an axis and relative to the clutch ring to move the clutch ring relative to the device housing. The retainer has a first portion that engages the device housing and a second portion that extends from the first portion radially toward the axis, and the second portion radially overlaps the coil housing and limits axial movement of the coil housing relative to the device housing.

In at least some implementations, the first portion extends axially and is engaged with part of the device housing. In at least some implementations, the first portion is received within a groove in the device housing.

In at least some implementations, the first portion of the retainer may conveniently be press-fit into or onto part of the device housing, and the second portion may overlap a surface of the coil housing to facilitate retention of the coil housing in a desired position or location relative to the device housing. In at least some implementations, the retainer may be installed without the need for fasteners, adhesives, bonding, welding or the like.

BRIEF DESCRIPTION OF THE DRAWINGS

The following detailed description of preferred embodiments and best mode will be set forth with reference to the accompanying drawings, in which.

DETAILED DESCRIPTION

Figure 1:
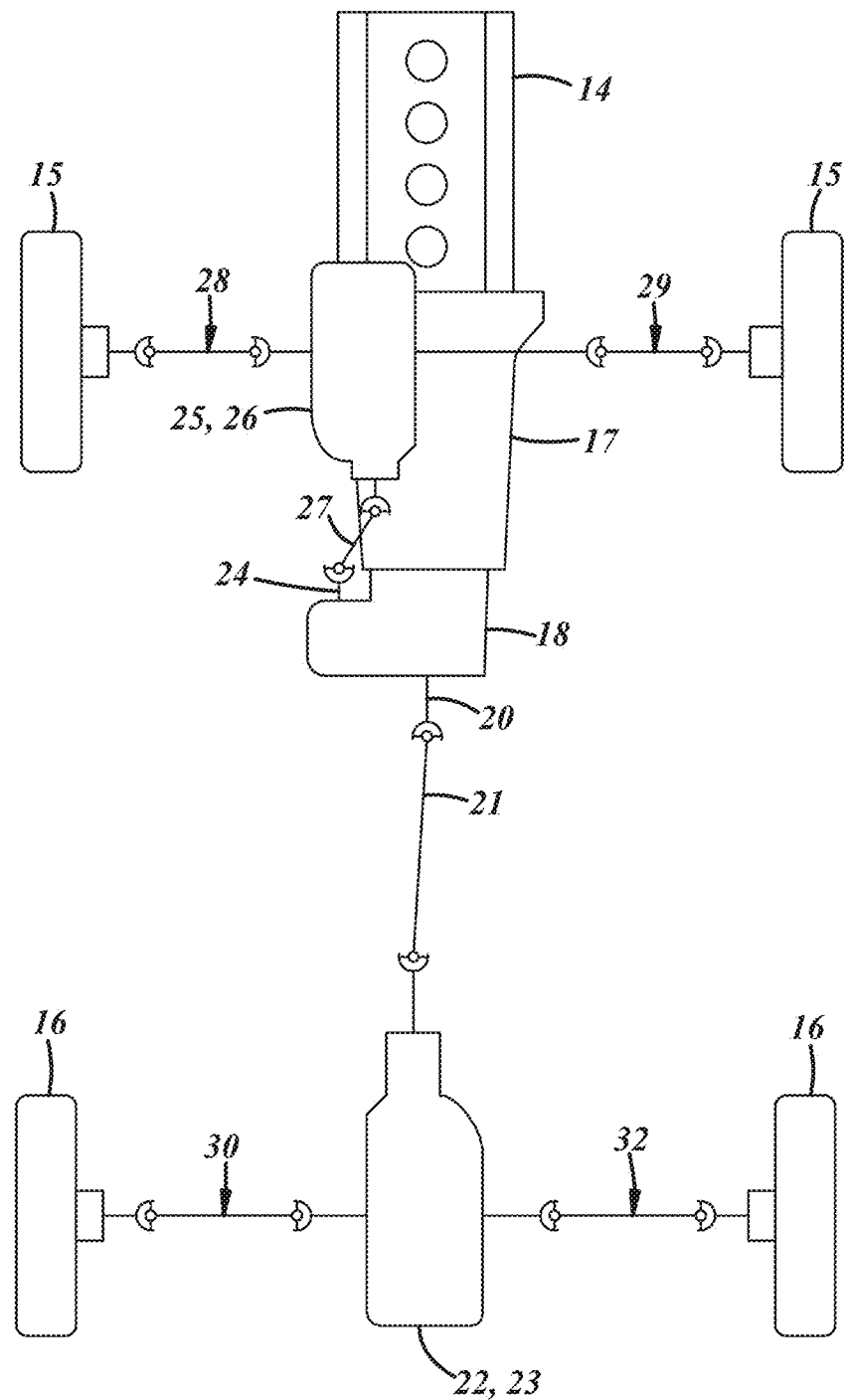
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16.

Of course, other driveline configurations may be used, as desired. For example, while shown in rear drive based driveline, lockup differentials can also be used in front based all-wheel drive system, or even in two-wheel drive front engine/front wheel drive or front engine/rear wheel drive drivetrains, as well as in an e-axle (e-motor driven final drive unit).

Figure 2:
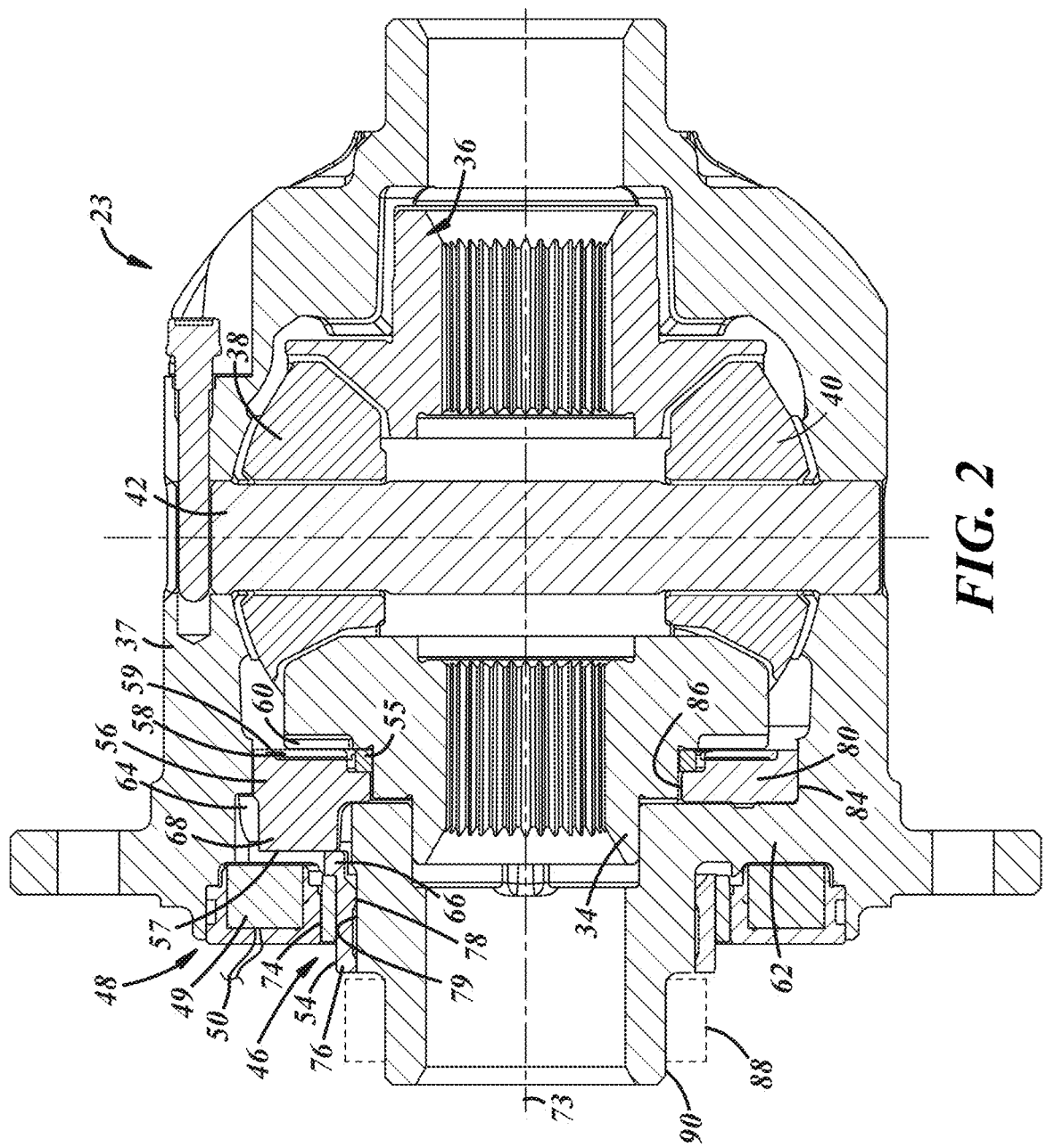
FIG. 2 is a cross-sectional view of a differential with an electrically actuated clutch, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23 (which may be called a differential housing or device housing). The differential also includes pinion gears 38, 40 that are meshed with side gears 34, 36, respectively, and which are mounted within the housing 37 on a pinion shaft 42.

To selectively lock and unlock the differential 23 a clutch assembly 46 is provided. The clutch assembly 46 may have actuated and deactuated states, and in one state the clutch assembly couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the clutch assembly 46 is electrically actuated and includes an actuator having a solenoid 48 with an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the clutch assembly 46 is actuated when the plunger 54 is in the second position and the clutch assembly is deactuated when the plunger is in the first position. While in the example shown the plunger 54 is in its second position when power is provided to the coil 49 and the plunger moves to the first position when power is not supplied to the coil, the opposite could be true if desired (e.g. the clutch assembly 46 could be moved to the actuated position by the biasing member 55 and deactuated by powering the coil).

In at least some implementations, the clutch assembly 46 may further include or be associated with a clutch member, called herein a clutch ring 56 adapted to be driven by the plunger 54 and to interface with the side gear 34 as set forth below. The clutch ring 56 may be annular and a portion of the second side gear 36 and/or shaft 32 may extend through the clutch ring. The clutch ring 56 may include a rear face 57 engageable by the plunger 54 and a front face 59 having at least one engagement feature 58, such as gear or clutch teeth 58 (e.g. dog clutch teeth) configured to engage a corresponding engagement feature 60 (e.g. gear or dog clutch teeth) formed on a rear face of the first side gear 34. The spring 55 may act on the clutch ring 56 to urge the clutch ring into the plunger 54 and move the plunger to its first position when the coil 49 is not powered, as noted above. In the implementation shown, the plunger 54 is located adjacent to one side of a housing wall 62 and the clutch ring 56 is located adjacent to the other side of the wall 62. The wall 62 includes apertures 64, and the plunger 54 and clutch ring 56 include axially extending feet 66, 68, respectively, that extend into or through the apertures 64 in the wall so that the plunger and clutch ring are engaged with each other across or through the wall. Like the coil 49 and plunger 54, the clutch ring 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the clutch ring 56 is not engaged with the side gear 34 so that the side gear can rotate relative to the clutch ring 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the clutch ring 56 into engagement with the side gear 34 (i.e. teeth 58 engage and mesh with teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2, 4, 6, 9 and 10, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced.

Figure 3:
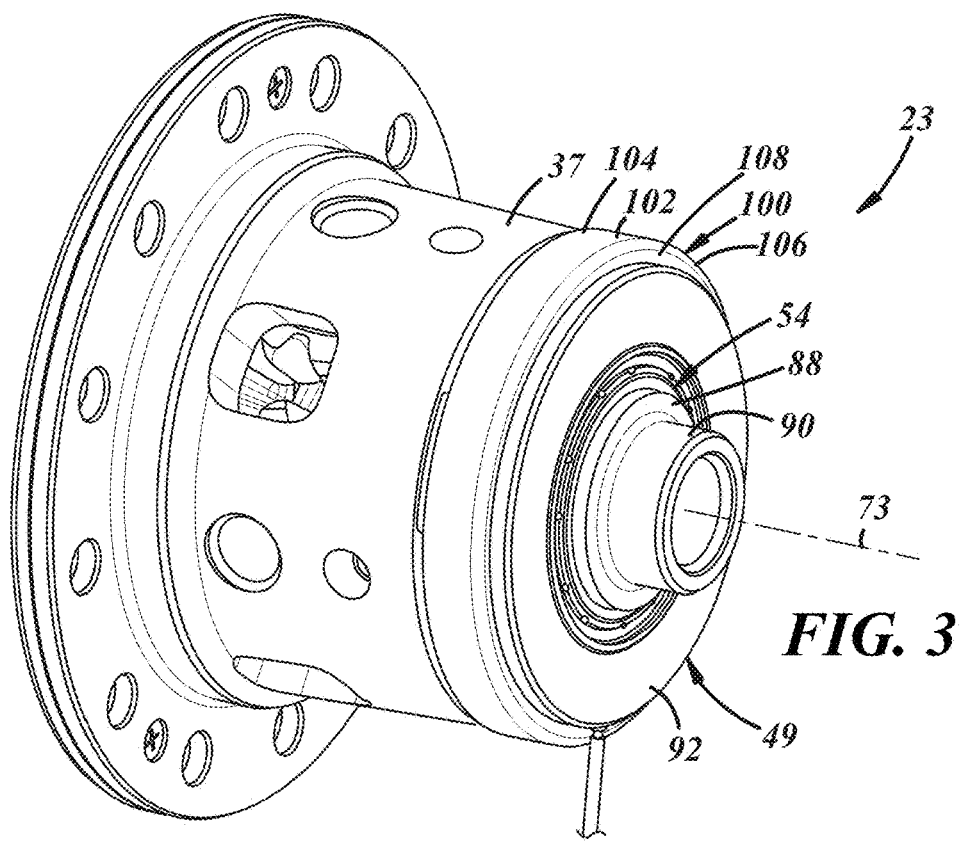
FIG. 3 is a perspective view of the differential including a retainer for a solenoid coil.

In at least some implementations, as shown in FIGS. 2 and 3, the plunger 54 includes a main body with a central axis 73 and which may be defined by a first body 74 and a second body 76 that are coupled together and move as one unit or component and are not separated during use. The first body 74 may be formed from a magnetically responsive material and may be received adjacent to and radially inwardly of the coil 49, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74, if desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. In this way, the magnetic field is more concentrated or stronger in the area of the first body 74 to increase the magnetic flux at or in the first body and improve the responsiveness of the plunger 54 to the generated magnetic field.

Figure 4:
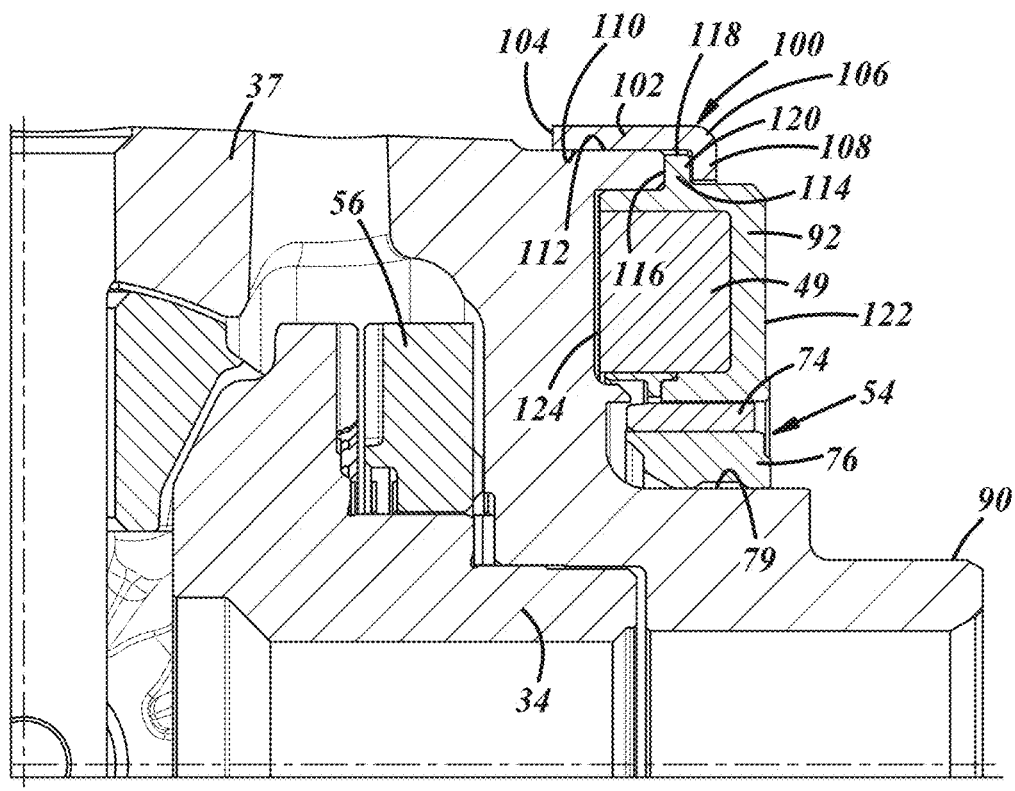
FIG. 4 is a fragmentary sectional view of a portion of FIG. 3.

As shown in FIGS. 2 and 4, the second body 76 may have an inner surface 78 that is received adjacent to or around a surface 79 of the differential housing 37. The inner surface 78 may define a pilot diameter for receipt of the plunger 54 over the annular surface 79 of the differential housing 37 for guided linear, axial movement of the plunger relative to the differential housing.

Referring to FIG. 2, the clutch ring 56 has a main body 80 with a central axis that may be coaxial with the axis 73 of the plunger 54, a radially outer surface 84 that extends axially between the rear face 57 and the front face 59, and a radially inner surface 86 that may have a lesser axial extent than the outer surface 84. The inner surface 86 of the clutch ring 56 may be received around a surface of the side gear 34. The feet 68 of the clutch ring 56 define part of the rear face 57, are circumferentially spaced apart and extend axially from other portions of the rear face 57. The teeth 58 are located on the front face 59. The clutch ring 56 may be made from metal, such as alloy steel, chromium steel, chromium molybdenum steel, nickel steel, nickel chromium molybdenum steel, mid/high carbon steel, etc.

In use of the differential 23, a bearing 88 is mounted on an exterior surface of a tubular portion 90 of the housing 37. In FIG. 2, the bearing 88 is shown in diagrammatic form as a broken line polygon, and may include an inner race having an inner surface on a tubular outer surface of the tubular portion, and an outer race received over the inner race. Suitable bearings are known in the art. As is shown in FIG. 2, the bearing 88 extends radially beyond the surface 79 along with the plunger 54 slides in use. The plunger 54 may be prevented from sliding off the housing 37 by engagement with the bearing 88. In addition, an annular ring may be received over the housing surface 79, axially located between the plunger and the bearing. The ring may extend radially and overlap the coil 49 to prevent axial movement of the coil 49 relative to the housing 37.

In the implementation shown in FIG. 3, the coil 49 is received within a housing 92, which may be made from any suitable material such as various plastics. The housing 92 may be formed from more than one piece to facilitate assembly of the coil 49 into the housing 92, the housing may be molded over the coil, and the housing may be annular and may completely enclose the coil, if desired. In implementations in which a ring was received over housing surface 79 to retain the coil, the ring may be press-fit onto the surface 79 and butted against the adjacent side of the coil housing 92, such that the coil housing 92 was trapped between the ring and housing 37. So situated, the ring consumed some axial portion of the surface 79, requiring a longer surface to accommodate the ring and the full axial travel of the plunger 54.

This added axial length increased the overall size of the differential housing 37 and created challenges for drivetrains in which many components are needed to be fit within smaller areas. Alternatively, if other portions of the housing 37 were made smaller to accommodate the extra space needed for the ring, then the strength and torque capacity of one or more portions of the housing 37, clutch ring 56 or other component would be reduced. In the example shown in U.S. Pat. No. 10,473,203, multiple separate clips are used to overlap the coil housing to retain the coil on a differential housing. Installation of the individual clips can be time consuming and access to the fasteners used to secure the clips can be difficult, as is handling and installation of the smaller clips and fasteners. Also, the clips and fasteners in that example require radial space between the coil housing and fasteners that mount the differential housing to a support via mounting flange, which can increase the size of the housing.

In FIGS. 3 and 4, a retainer 100 is provided to inhibit or prevent axial movement of the coil 49 relative to the differential housing 37. In at least some implementations, a first portion of the retainer 100 engages the differential housing 37 and a second portion of the retainer 100 engages the coil housing 92.

In the implementation shown, the retainer 100 is annular and includes a cylindrical and axially extending sidewall 102 with a thickness in the radial direction. The sidewall 102 extends from a first end 104 to a second end 106, and the retainer 100 includes a radially inwardly extending flange 108 at the second end 106 of the sidewall 102. A radially inner surface 110 of the sidewall 102 has a diameter sized for close-receipt over an outer surface 112 of the differential housing 37 adjacent to the coil 49. The retainer 100 may be connected to the housing 37 by a press-fit or friction fit, by one or more fasteners, adhesive, weld, crimp, staking, or the retainer may include an inwardly extending projection received in an opening or slot in the differential housing 37. In at least some implementations, the surface 112 over which the sidewall 102 is receive has a reduced diameter such that the addition of the retainer 100 thereto does not enlarge the peripheral size of the housing 37. That is, the outer diameter of the retainer 100 may be equal to or less than the outer diameter of a portion of the housing 37 axially adjacent to the retainer 100. In at least some implementations, the portion of the differential housing 37 to which the coil housing 92 is mounted is not under high stress and so a reduction in thickness of the differential housing 37 in this area does not compromise the durability of the housing 37. Of course, other arrangements maybe used, as desired.

When assembled onto the housing 37, the flange 108 of the retainer 100 radially overlaps the coil housing 92 and may be axially abutted against a portion of the coil housing 92. So assembled, the coil housing 92 is axially trapped between the flange 108 and a surface of the differential housing 37. In the example shown, the coil housing 92 includes a radially outwardly extending flange 114 having a first face 116 received against the differential housing 37, a radially outer surface 118 and a second face 120 opposite to the first face 116. In assembly, the retainer flange is received over the outer surface 118 and adjacent to or against the second face 120, such that the coil housing flange 114 is trapped between the differential housing 37 and the retainer flange 108. In at least some implementations, the coil housing flange 114 is axially spaced from an outboard end 122 of the coil housing (where an inboard end 124 of the coil housing is received adjacent to or against the differential housing) by a distance at least as great as an axial thickness of the retainer flange 108. Thus, in assembly, the retainer flange 108 does not extend axially beyond the outboard end 122 of the coil housing 92, and so does not increase the axial dimension of the differential 23.

The retainer 100 may be made of any suitable material including various metals and plastics and composite materials. The retainer 100 may be lightweight and durable. Further, the single piece retainer 100 may engage a circumferentially continuous portion of the coil housing 92 or discrete, spaced apart portions of the housing 92 to securely retain the coil housing 92 to the differential housing 37. The single piece retainer 100 may be easier to handle and install than multiple clips with multiple fasteners. While described above as being annular, the retainer 100 may be c-shaped with a slot or opening defining free ends of the retainer. In at least some implementations, the retainer 100 circumferentially spans more than 180 degrees, and in some implementations the retainer may span more than 300 degrees, so that ends of the retainer 100 on either side of the gap are spaced apart less than the outer diameter of the portion of the housing 37 on which the retainer is received.

Figure 5:
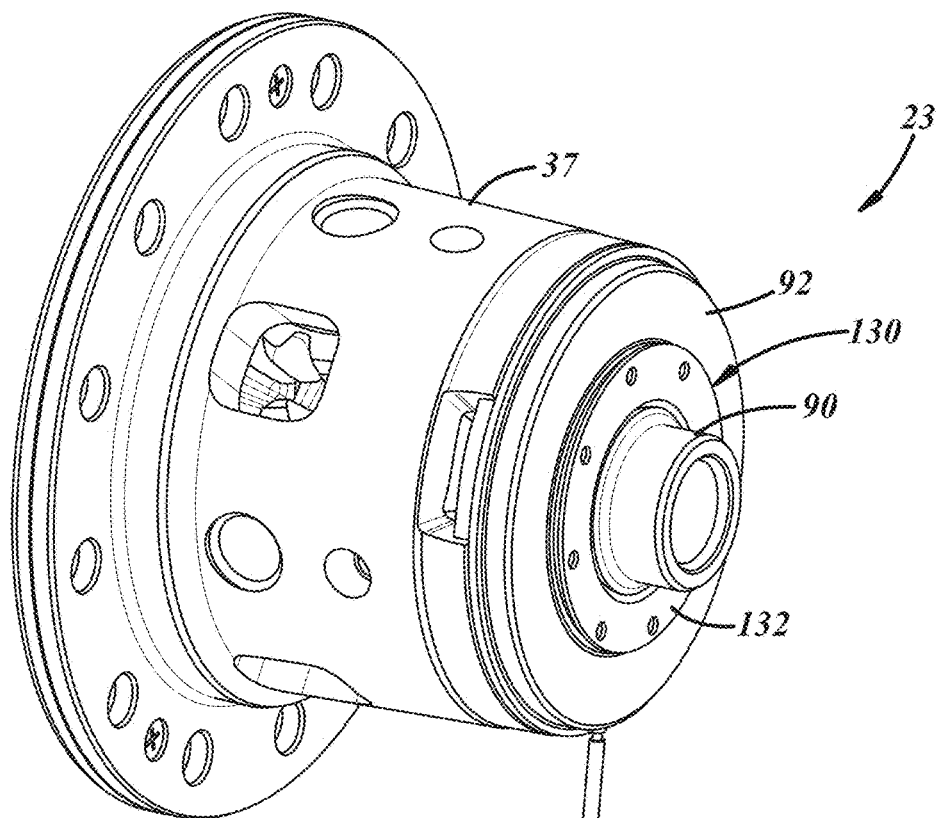
FIG. 5 is a perspective view of the differential including a retainer for a solenoid coil.
Figure 6:
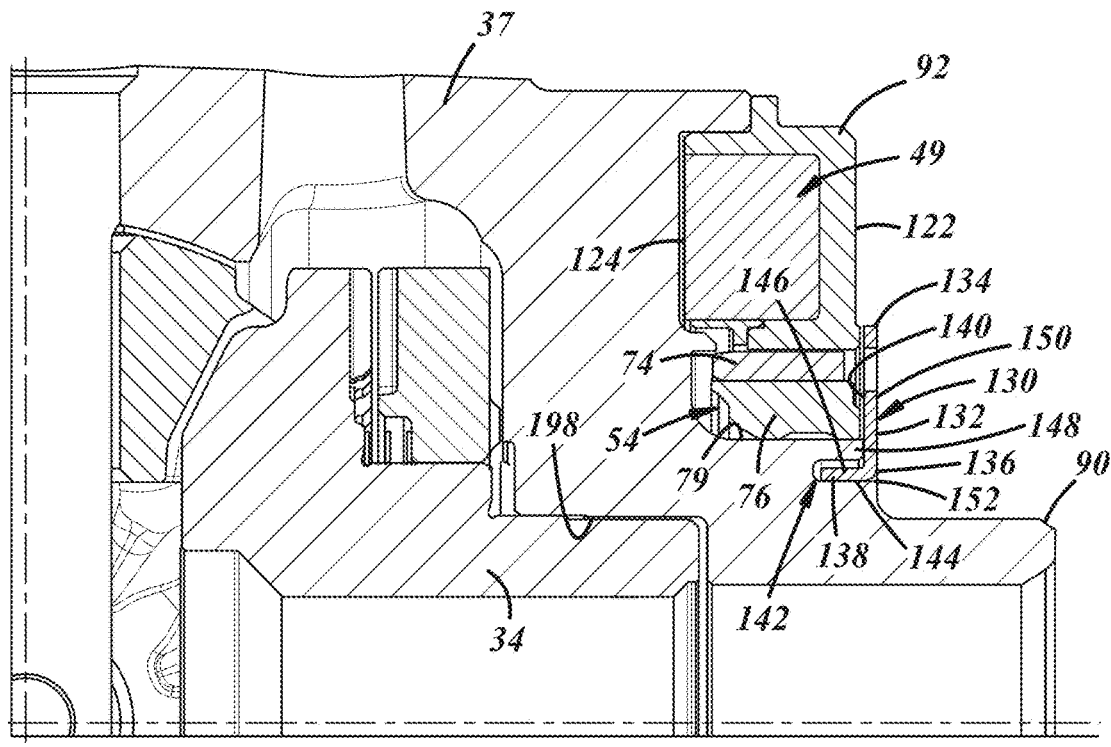
FIG. 6 is a fragmentary sectional view of a portion of FIG. 5.
Figure 7:
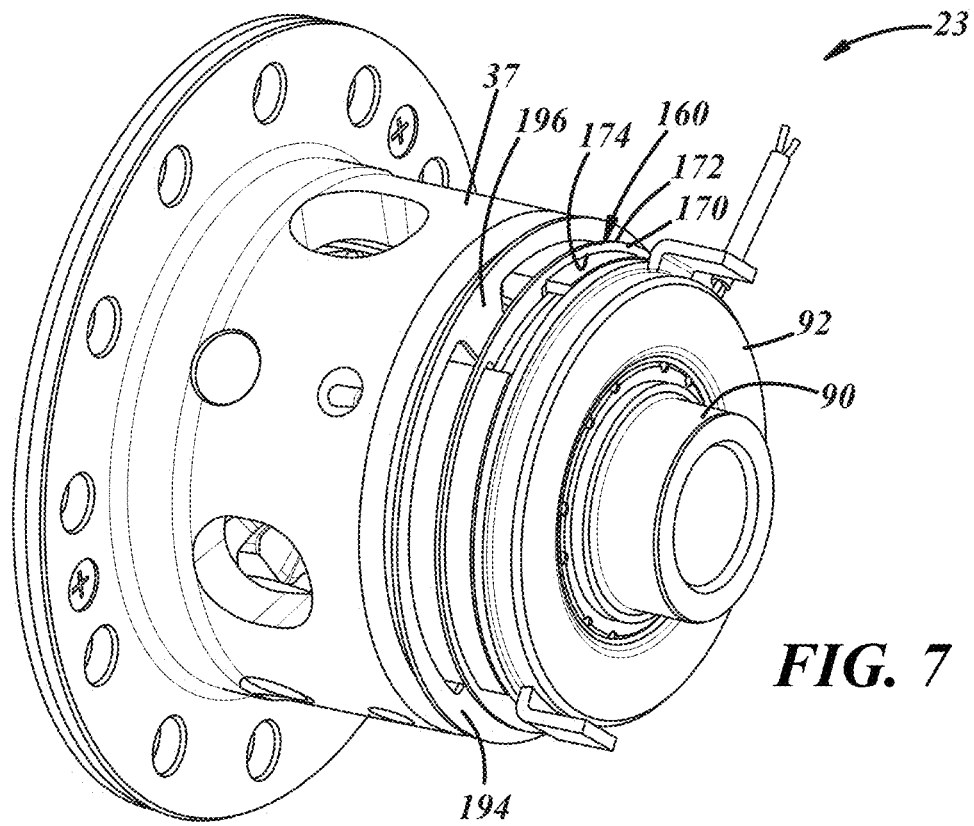
FIG. 7 is a perspective view of the differential including a retainer for a solenoid coil.

FIGS. 5 and 6 relate to a differential that may be constructed and arranged similar to the differential 23 described above with regard to FIGS. 2-4, with differences noted herein. To facilitate description of this embodiment, the same reference numbers will be used for the same or similar components already described, and the above description is incorporated herein. In FIGS. 5 and 6, a retainer 130 is provided to inhibit or prevent axial movement of the coil 49 relative to the differential housing 37. In at least some implementations, a first portion of the retainer 130 engages the differential housing and a second portion of the retainer 130 engages the coil housing.

In the implementation shown, the retainer 130 is annular and includes a cylindrical and radially extending sidewall 132 with a thickness in the axial direction. The sidewall 132 extends from a first end 134 to a second end 136, and the retainer 130 includes an axially extending flange 138 at the second end 136 of the sidewall 132. A radially inner surface 140 of the sidewall 132 extends radially so that the first end 134 overlaps the coil housing 92 and the inner surface 140 is arranged to contact the outboard end 122 of the coil housing. Also, the sidewall 132 radially overlaps and is axially outboard of the plunger 54.

In this implementation, the retainer is coupled to the differential housing 37 by the flange 138. In at least some implementations, the differential housing 37 includes a groove or slot 142 into which the flange 138 is received. The flange 138 may be connected to the housing 37 by a press-fit or friction fit, by one or more fasteners, adhesive, weld, crimp, staking, or the like. In at least some implementations, either the radially inner surface 144 or radially outer surface 146 of the flange 138 is arranged to frictionally engage an adjacent surface of the differential housing 37 within the slot 142. So arranged, when the flange 138 is pressed into the slot 142, the inner surface 140 of the sidewall 132 engages the coil housing 92 and traps the coil housing 92 against the differential housing 37 to prevent axial movement of the coil housing 92 relative to the differential housing 37. In at least some implementations, a portion 148 of the differential housing 37 radially outward of the slot 142 may have a reduced axial extent so that an outer surface 150 of the retainer 130 does not extend axially beyond a radially inner surface 152 of the slot 142, and the axial position of the bearing 88 is not affected by the retainer 130 when installed in the slot 142. Further, the retainer 130 may be connected to or held in position by a bearing, like bearing 88. For example, the retainer 130 could be trapped between the bearing 88 and a surface of the housing 37, with or without any flange received in a slot (e.g. flange 138 and slot 142 would be optional in such implementations).

In at least some implementations, the slot 142 is formed in a surface located radially inwardly of the housing surface 79 along which the plunger 54 moves. In at least some implementations, the area of the housing 37 in which the slot 142 is formed is not under high stress in use of the differential 23, and so a reduction in thickness of the housing 37 in this area does not compromise the durability of the housing 37. Of course, other arrangements maybe used, as desired.

The retainer 130 may be made of any suitable material including various metals and plastics and composite materials. The retainer 130 may be lightweight and durable. Further, the single piece retainer 130 may engage a circumferentially continuous portion of the coil housing 92 or discrete, spaced apart portions of the housing to securely retain the coil housing to the differential housing 37. The single piece retainer 10 may be easier to handle and install than multiple clips with multiple fasteners. While described above as being annular, the retainer 130 may be c-shaped with a slot or opening defining free ends of the retainer. In at least some implementations, the retainer circumferentially spans more than 180 degrees and in some implementations the retainer may span more than 300 degrees between the ends.

Further, the retainer 130 may provide a stop surface that limits movement of the plunger 54 (e.g. may define the first position of the plunger 54. In some implementations, an incomplete differential assembly that does not include the bearing 88 may be shipped from one location to another, and without the bearing in place the plunger 54 could become separated from the differential housing 37. So in addition to or instead of defining the first position of the plunger 54, the retainer 130 may retain the plunger 54 on the housing 37 until the bearing 88 or other plunger stop surface is provided.

FIGS. 7-10 relate to a differential that may be constructed and arranged similar to the differential 23 described above with regard to FIGS. 2-4, with differences noted herein. To facilitate description of this embodiment, the same reference numbers will be used for the same components already described, and the above description is incorporated herein. In FIGS. 7-10, a retainer 160 is provided to inhibit or prevent axial movement of the coil 49 relative to the differential housing 37. In at least some implementations, a first portion of the retainer 160 engages the differential housing and a second portion of the retainer 160 engages the coil housing 92.

In the implementation shown, the retainer 160 is mostly annular with a gap 162 between circumferentially spaced apart first and second ends 164, 166 of the retainer. Thus, the retainer has a so-called "C-shape." In at least some implementations, the retainer 160 circumferentially spans more than 180 degrees, and in some implementations the retainer may span more than 300 degrees, so that the ends 164, 166 of the retainer 160 are spaced apart less than the outer diameter of the portion of the housing 37 on which the retainer 160 is received.

Figure 10:
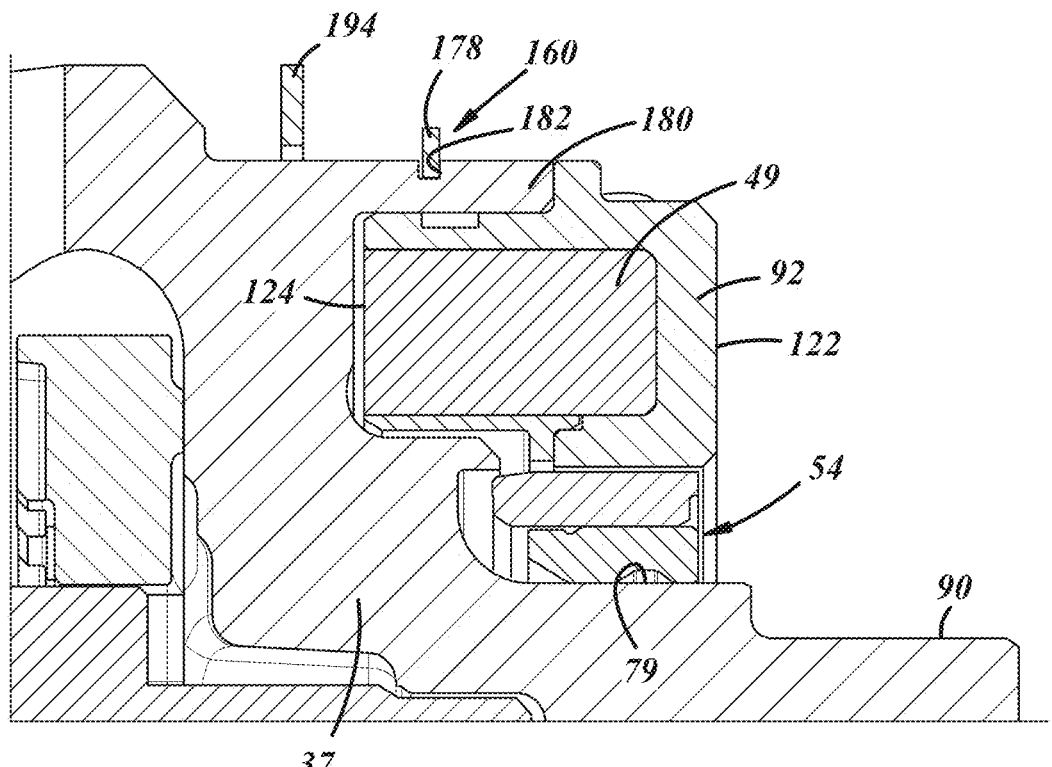
FIG. 10 is a fragmentary sectional view of a portion of FIG. 7.
Figure 8:
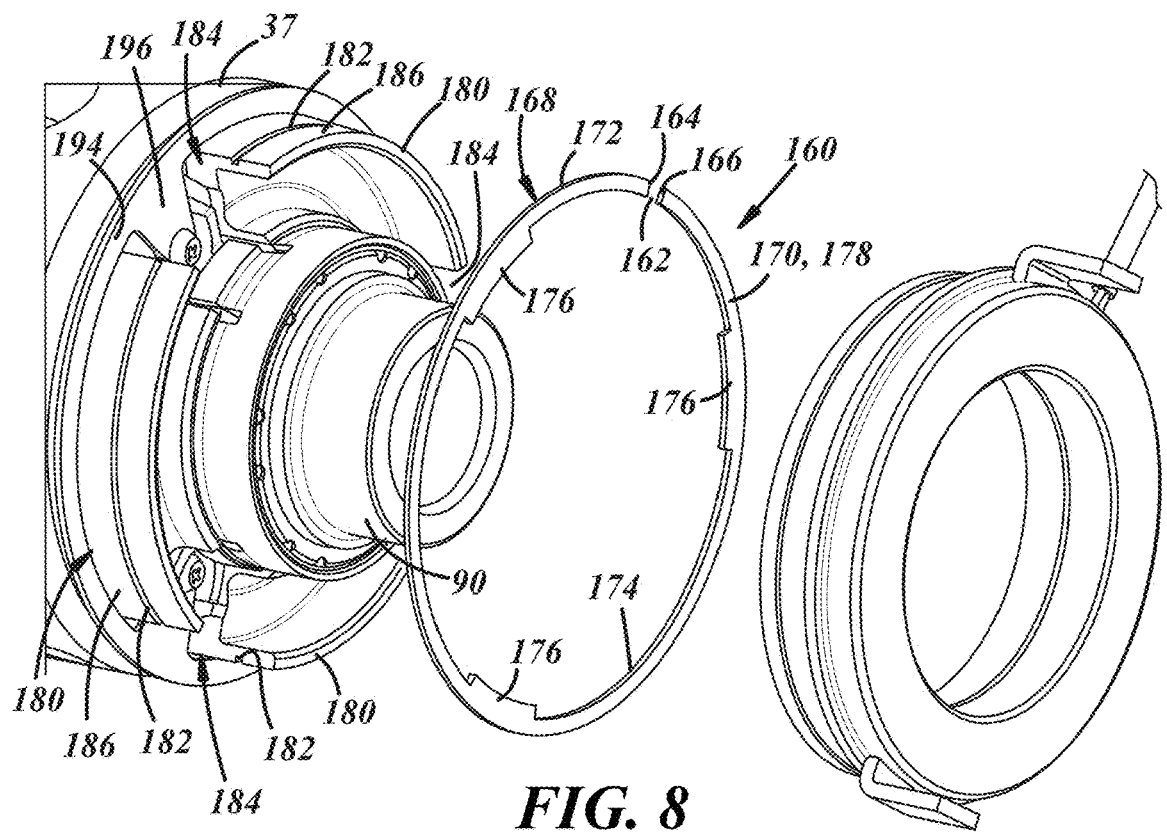
FIG. 8 is an exploded perspective view of the differential and retainer and solenoid coil.
Figure 9:
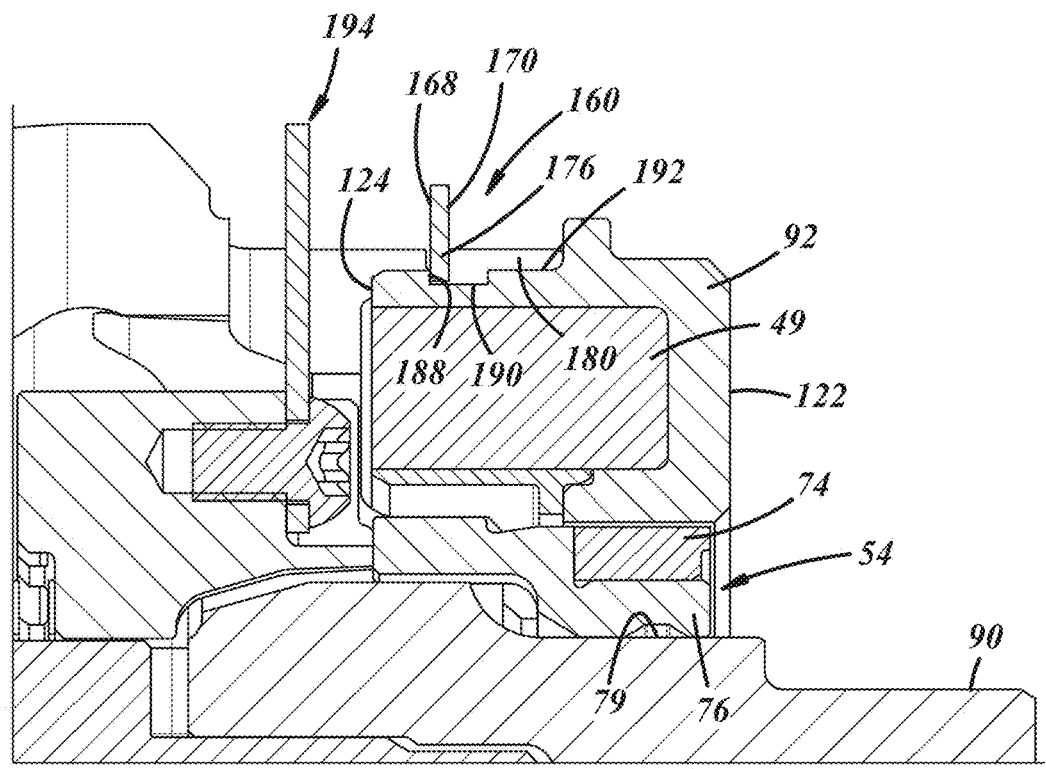
FIG. 9 is a fragmentary sectional view of a portion of FIG. 7.

The retainer 160 has an axial dimension between inward and outward faces 168, 170, and a radial dimension between outer and inner surfaces 172, 174. As shown in FIGS. 8-10, the outer surface 172 may have the same radius along the entire circumferential extent of the retainer, or be otherwise formed, as desired. The inner surface 174 has a varied radius along the circumferential extent of the retainer 160 along which multiple, spaced apart and radially inwardly extending flanges 176 are provided. So arranged, a main body 178 of the retainer 160 has a first radial dimension and in the area of the flanges 176, the retainer 160 has a second, greater radial dimension. The sectional view of FIG. 9 was taken through a flange 176, and the sectional view of FIG. 10 was taken through a portion of the main body 178 of the retainer.

As shown in FIG. 8, the differential housing 37 has one or more axially extending skirts 180 that are radially outboard of and axially overlap at least part of the coil housing 92. Multiple skirts 180 are shown in FIG. 8 and the housing 37 will be described with reference to multiple skirts herein. The skirts 180 each include a groove 182 in a radially outer surface, and in assembly, the retainer 160 is received in the grooves 182. To receive the retainer flanges 176, gaps 184 may be provided between adjacent skirts 180, as shown in FIG. 8. If one or more of the gaps 184 are not provided, suitably spaced apart openings may be provided aligned with the grooves 182 and extending through the skirts. In such an arrangement, the retainer 160 may need to be opened further to permit the retainer flanges to clear the outer surface of the skirt(s). In at least some implementations, the inner surface 174 of the main body 178 is radially smaller than the outer surface 186 of the skirt(s) and so the retainer 160 must be flexed and opened up so that the inner surface 174 clears and passes over the outer surface 186 of the skirt(s). Then, when the retainer 160 is aligned with the grooves 182, the material of the retainer 160 can elastically return to its unflexed state with the inner surface 174 received in and radially overlapped by the skirts 180 within the grooves 182. The grooves 182 may have an axial dimension sized to receive the retainer 160 therein and to limit axial movement of the retainer 160 relative to the differential housing 37.

To retain the axial position of the coil housing 92 with the retainer 160 installed on the skirt(s), the coil housing 92 includes a radially extending and axially facing stop surface 188. As shown in FIG. 9, a retainer flange 176 radially overlaps and is axially adjacent to the stop surface 188. A portion of the coil housing 92 between the inboard end 124 and the stop surface 188 is trapped between the differential housing 37 and the inward face 168 of the retainer 160, specifically, the inward face 168 of a retainer flange 176. In this way, axial movement of the coil housing 98 relative to the differential housing 37 is limited or prevented. In the example shown, the stop surface 188 is a sidewall of a groove 190 provided in the radially outer surface 192 of the coil housing 92, where the groove 190 is wider than the axial dimension of the retainer 160 (e.g. the axial dimension of the retainer flanges 176).

In at least some implementations, the differential includes an annular plate 194 that has inwardly extending tabs 196 received within the gaps 184 between the skirts 180. The tabs 196 may be bolted to the clutch ring 56 to enable detection of the position of the clutch ring 56 by a position sensing apparatus responsive to movement of the plate 194. In such an arrangement, the retainer flanges 176 may be constructed and arranged for receipt in the same gaps 184 between the skirts 180 that already are provided for the plate 194. Further, the plate 194 and/or part of the housing 37 may have a larger outer diameter than the retainer 160, and the retainer 160 may be received between the axial ends of the differential housing 37 such that the retainer 160 does not increase the axial dimension of the differential 23.

The retainer 160 may be made of any suitable material including various metals and plastics and composite materials. The retainer 160 may be lightweight and durable. Further, the single piece retainer 160 may engage a circumferentially continuous portion of the coil housing 92 or discrete, spaced apart portions of the housing 92 to securely retain the coil housing to the differential housing 37. The single piece retainer 160 may be easier to handle and install than multiple clips with multiple fasteners.

The retainers 100, 130, 160 avoid the need to accommodate a component on the surface 79 along which the plunger 54 moves. This enables surface 79 to be axially shorter, if desired, and that distance/dimension can be added to one or both of the clutch ring 56 and a surface 198 (labeled in FIG. 6) of the differential housing 37 overlapped with the side gear 34. Providing a thicker clutch ring 56 strengthens the clutch ring and enables the clutch ring to handle higher loads. Providing a longer interface between the differential housing surface 198 and side gear 34 strengthens the housing 37 and enables the housing to handle higher loads.

Further, the coil 49 can be made larger to enable a more powerful driving force for the plunger 54. For example, the coil 49 can now extend the full length of the surface 79 or more, with a component retaining the coil no longer positioned on the surface 79 and interfering with such extension or enlargement of the coil.

The extra strength of the housing 37 and/or clutch ring 56, and the ability to enlarge the size of the coil 49, are commercially relevant in at least some applications in which smaller sized differential assemblies are required in relatively high torque applications. Simply making the housing bigger to accommodate higher loads is not acceptable and making the housing smaller while still functional can be difficult to accomplish. Accordingly, the retainers described herein are a significant advance over previous components used to retain a solenoid coil on a differential housing.

Although the above descriptions relate to a locking differential device, other rotary power transmission devices, such as power take-off units or axle disconnects, could utilize a clutch with an actuator as described herein. In this regard, the power transmission device may include multiple rotating components, like gears and/or shafts, with the clutch and actuator used to selectively couple together at least two of the components to, for example, change a torque flow path through the device. Thus, the disclosure relates more generally to an actuator with a retainer as described, without being limited to a particular application. The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A rotary power transmission device, comprising:
a device housing having an interior in which multiple components are received for rotation;
a clutch received within the device housing and having a clutch ring selectively engageable with one of said multiple components;
an actuator having a coil and a plunger driven for movement along an axis and relative to the clutch; and
a retainer having a first portion that engages the device housing and a second portion that radially overlaps the coil and limits axial movement of the coil relative to the device housing, wherein the coil includes a coil housing and a wire coil within the coil housing, and wherein the first portion extends axially and is received over a portion of the device housing, and the second portion extends radially from the first portion and radially overlaps part of the coil housing, and the coil housing has an inboard end adjacent to the device housing, and the coil housing has an outboard end opposite and axially spaced from the inboard end, and wherein the retainer overlaps part of the coil housing between the inboard end and the outboard end, and the retainer does not extend axially beyond the outboard end.

2. The device of claim 1 wherein the first portion of the retainer is press-fit onto an outer surface of the device housing.

3. The device of claim 1 wherein the coil housing has an inboard end adjacent to the device housing, and the coil housing has an outboard end opposite and axially spaced from the inboard end, and wherein the retainer overlaps part of the coil housing between the inboard end and the outboard end, and the retainer does not extend axially as far as the outboard end.

4. The device of claim 3 wherein the coil housing includes a flange that extends radially outwardly and is located between the inboard end and the outboard end, and the flange includes a first face received against the device housing and the flange includes a second face engaged by the second portion of the retainer.

5. The device of claim 2 wherein the first portion includes a radially inner surface that is received against the outer surface of the device housing.

6. A rotary power transmission device, comprising:
a device housing having an interior in which multiple components are received for rotation;
a clutch ring received within the device housing and selectively engageable with one of said multiple components;
an actuator having a coil housing, a wire coil within the coil housing, and a plunger driven for movement along an axis and relative to the clutch ring to move the clutch ring relative to the device housing; and
a retainer having a first portion that extends axially and includes a radially inner surface that is received over a portion of the device housing and the radially inner surface that engages the device housing and the retainer has a second portion that extends from the first portion radially toward the axis, wherein the second portion radially overlaps the coil housing, does not radially overlap the wire coil, and limits axial movement of the coil housing relative to the device housing.

7. The device of claim 6 wherein the first portion extends axially and is engaged with part of the device housing.

8. The device of claim 7 wherein the first portion is press-fit onto an outer surface of the device housing.

9. The device of claim 6 wherein the coil housing has an inboard end adjacent to the device housing, and the coil housing has an outboard end opposite and axially spaced from the inboard end, and wherein the retainer overlaps part of the coil housing between the inboard end and the outboard end, and the retainer does not extend axially beyond the outboard end.

10. The device of claim 9 wherein the coil housing includes a flange that extends radially outwardly and is located between the inboard end and the outboard end, and the flange includes a first face received against the device housing and the flange includes a second face engaged by the second portion of the retainer.

11. The device of claim 6 wherein an outer diameter of the first portion is equal to or less than an outer diameter of the device housing axially adjacent to the retainer.

12. A rotary power transmission device, comprising:
a device housing having an interior in which multiple components are received for rotation;
a clutch ring received within the device housing and selectively engageable with one of said multiple components;
an actuator having a coil housing, a coil within the coil housing, and a plunger driven for movement along an axis and relative to the clutch ring to move the clutch ring relative to the device housing; and a retainer having a first portion that is press-fit or friction fit to so that a radially inner surface of the first portion engages the device housing and the retainer has a second portion that extends from the first portion radially toward the axis, wherein the second portion radially overlaps the coil housing and limits axial movement of the coil housing relative to the device housing, wherein the coil housing has an inboard end adjacent to the device housing, and the coil housing has an outboard end opposite and axially spaced from the inboard end, and wherein the retainer overlaps part of the coil housing between the inboard end and the outboard end, and the retainer does not extend axially beyond the outboard end.

13. The device of claim 12 wherein the coil housing includes a flange that extends radially outwardly and is located between the inboard end and the outboard end, and the flange includes a first face received against the device housing and the flange includes a second face engaged by the second portion of the retainer.

14. The device of claim 12 wherein an outer diameter of the first portion is equal to or less than an outer diameter of the device housing axially adjacent to the retainer.

* * * * *